United States Patent [19]

Rebeillard et al.

[11] Patent Number: 5,072,385

[45] Date of Patent: Dec. 10, 1991

[54] METHOD FOR GATHERING AND CLASSIFYING ITEMS OF INFORMATION

[76] Inventors: Serge J. Rebeillard; Cecile D. Kreweras, both of 32,34 rue de Longchamp, 75016 Paris, France

[21] Appl. No.: 657,385

[22] Filed: Feb. 19, 1991

Related U.S. Application Data

[63] Continuation of Ser. No. 279,163, Dec. 2, 1988, abandoned.

[30] Foreign Application Priority Data

Dec. 2, 1987 [FR] France ................ 87 16729

[51] Int. Cl.⁵ .............................. G09F 3/00
[52] U.S. Cl. ............................... 364/419
[58] Field of Search .............. 364/419; 235/57

[56] References Cited

U.S. PATENT DOCUMENTS 4,029,943 6/1977 Rodriquez ................ 235/57

FOREIGN PATENT DOCUMENTS 8700798 2/1987 World Int. Prop. O. .

Primary Examiner—Gail O. Hayes
Attorney, Agent, or Firm—Sughrue, Mion, Zinn, Macpeak & Seas

[57] ABSTRACT

The method for gathering items of information from persons representing a sample of the population comprises establishing a list of questions or propositions; inscribing each proposition on a distinct card; supplying to each of the persons of the sample a group of cards each bearing one of the propositions in respect of which these persons must give an opinion; placing each of these persons in front of a support comprising a given number of compartments assigned different values; each of the persons constituting the sample classifying the various propositions by disposing the corresponding cards in the various compartments of the support; then assigning to each proposition a "mark" or a "coefficient" in accordance with its position on the support. Such a method permits in particular establishing an exact order of importance among a certain number of propositions and operating with smaller but nonetheless representative samples.

4 Claims, 1 Drawing Sheet

METHOD FOR GATHERING AND CLASSIFYING ITEMS OF INFORMATION

This is a continuation of application Ser. No. 07/279,163, filed Dec. 2, 2988.

BACKGROUND OF THE INVENTION

The present invention relates to a method and device for gathering items of information for their subsequent processing in very diverse fields for aiding in decision making, such as market research, commercial policy in firms, communication, etc...

At the present time, the required items of information may be gathered by means of questionnaires distributed among a group of persons constituting a sample of the population to be studied. These questionnaires consist of a certain number of "questions" or "propositions" in respect of which each person of the sample must assign a note or mark, for example from 1 to 4 or from 1 to 5, or an appreciation of the type "a little", "a lot", "never", "always", etc...

As a variant, the questions are put to the questioned person by an inquirer.

In both cases, this manner of gathering information is not satisfactory, since the propositions are presented in an isolated manner, with no relation therebetween so that the mark given by the questioned person to each of these propositions does not take into account the contents of the other propositions. The order of importance which will thereafter be established between the various propositions could not be significant since it will be the result of a means of notes or marks given to isolated propositions.

Furthermore, when the questionnaire is presented by an inquirer the questioned person cannot disregard in his replies the relation created with the person questioning him. In other words, the presence of the inquirer disturbs in a marked manner the questioned person and may consequently bring about a shifting of emphasis or opinions in his replies.

If the gathering of the items of information is in this way disturbed, the order of importance which is thereafter established between the various propositions formulated for the attention of the questioned persons is of course also rendered false and the interpretation of the results is necessarily altered.

In an effort to attenuate this defect, one is led to increase the size of the sample, which burdens the procedures and increases the cost thereof.

SUMMARY OF THE INVENTION

An object of the present invention is to provide a method and a device for gathering items of information which overcome these drawbacks and in particular to establish from the gathered items of information a correct order of values corresponding in actual fact to the classification which may be given by the persons constituting the sample. This method and device must moreover permit achieving an analogy which is as complete as possible between the behaviour of the person who classifies the propositions and the behaviour of this same person in a real situation.

The invention therefore provides a method for gathering and processing items of information from persons representing a population sample, said method comprising establishing a list of questions or propositions; inscribing each proposition on a distinct card, supplying to each of the persons of the sample a group of cards each bearing one of the propositions in respect of which these persons must give an opinion; placing each of these persons in front of a support having a given number of compartments assigned different values; each of the persons constituting the sample classifies the various propositions by placing the corresponding cards on the various compartments of the support; then giving each proposition a "mark" or a "coefficient" in accordance with its position on the support.

The invention also provides a device for carrying out the method defined hereinbefore and comprising a group of N1 cards each bearing a proposition or an item of information, and a support comprising a number N2 of compartments which are assigned different values.

According to other features of the invention:

the number N2 of compartments of the support is greater than the number N1 of cards bearing the propositions;

preferably, the number N2 of compartments is greater than twice the number N1 of cards bearing the propositions;

the compartments are disposed along a line;

the compartments are arranged in accordance with a grid having two dimensions.

The invention also provides a method for processing items of information gathered by the aforementioned method, said method comprising assigning to each of the propositions submitted to the persons constituting the sample a coefficient determined from the position of the compartment in which the card bearing this item of information is located, effecting a classification of all of the propositions for each of the persons of the sample, determining for each proposition or for a group of propositions the real dispersion of the classification effected by all of the persons constituting the sample, determining the maximum theoretical dispersion for a sample of the same size and calculating the value of a magnitude by means of the formula:

$$C = K\left(1 - \frac{\sigma}{\Sigma}\right)$$

in which K is a coefficient preferably equal to 100.

The invention will be described in more detail hereinafter in its various aspects with reference to the accompanying drawing in which:

BRIEF DESCRIPTION OF THE DRAWING

FIG. 1 shows a support 1 on which is drawn a grid 2 having for example twenty columns and five rows. For reasons of clarity, the columns have been numbered 1 to 20 and the rows 1 to 5, but this numbering is not indispensible.

DETAILED DESCRIPTION OF PREFERRED EMBODIMENTS

Figure 1:
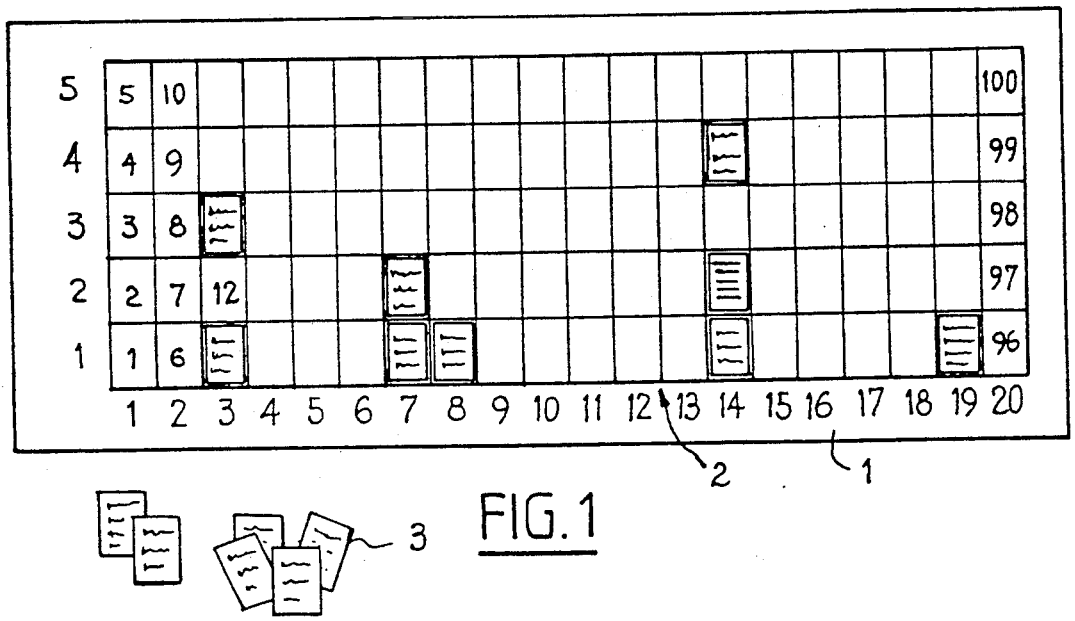
FIG. 1 shows a support defining compartments and cards bearing propositions.

The support may conveniently be formed by a cloth similar to a cloth for a game of cards. The grid may be materialized by series of horizontal and vertical lines or by dots representing the compartments or in any other suitable manner.

Also shown in the drawing are cards 3 tokens or the like constituting supports on which are shown items of information or propositions which were determined subsequent to a prior inquiry. These supports are sufficiently rigid for their manipulation.

Preferably, the number N2 of compartments shown on the cloth is substantially greater than the number N1 of cards bearing the propositions. As an example, 30 to 40 cards may be used for a cloth having 100 compartments, as shown.

The device constituted by the cloth and the cards is used in the following manner: after having selected a number of persons constituting a representative sample of the population aimed at, each of these persons is provided with a "set" of cards bearing the various propositions to be classified. Each of these persons is placed alone in front of the "cloth" and must dispose all of the cards on the compartments shown on this cloth. For this purpose, they effect a first classification along the lower row, the various propositions being classified in increasing order in the 20 compartments of this lower row.

Then, in a second stage, the cards placed on the same compartment of the lower row are classified in increasing order in the various compartments of the corresponding column.

Several propositions may of course be disposed in the same row, in the same column or on the same compartment and some compartments will necessarily remain free or empty.

The advantages of this type of gathering of information are considerable:

First of all, the fact that all the items of information or propositions are inscribed on cards, enables the questioned person to handle them and become acquainted with them and to consider them in relation to each other before classifying them.

All or a part of the cards having been disposed on the table, the questioned person may check that the effected classification in fact corresponds to that which he desires and, as the case may be, may correct the position of certain cards.

The questioned person is made to adopt an active attitude for effecting a classification between the various propositions submitted to him.

Consequently, there is a complete analogy between the behaviour of the person classifying the propositions and the behaviour of this person in a real situation, whether this situation be a situation of buying, voting, forming an opinion, etc...

By means of the grid shown in FIG. 1, a hierarchy or ranking may be established among the various propositions by assigning to each thereof a coefficient which, as a non-limitative example, may be formed by a number from 1 to 100 corresponding to the 100 compartments of the grid. The ranking obtained in this way is significant since, with the method of the invention, the various propositions have been classified without being presented in an isolated manner, and consequently in a situation of confrontation and comparison relative to one another.

The questioned person is neither disturbed nor influenced by the presence of an inquirer so that the classification effected is not disturbed and in fact corresponds to reality.

The results may be interpreted by conserving the whole of the observable information since this interpretation only uses the propositions in their original formulation and their classification, the latter merely resulting from the computer processing of the various classifications gathered from the elements of the sample.

A particularly interesting processing of the gathered items of information resides in the determination of the value of a "consensus indicator" which is calculated in the following manner:

the real dispersion (standard deviation) of a given proposition is determined from the classifications effected by all of the persons constituting the sample (the target); this dispersion is designated by the symbol $\sigma$ and is calculated by means of a conventional statistic method;

the maximum theoretical dispersion (or standard deviation) $\Sigma$ is calculated for a sample of the same size the value of the consensus indicator C is determined by means of a formula of the following type:

$$C = K\left(1\frac{\sigma}{\Sigma}\right)$$

in which K may be, for example, equal to 100;

if all the persons consulted have placed the same proposition at the same place on the cloth, the consensus is maximum and equal to 100;

on the other hand, if these persons have placed the same proposition at the end values of the grid, the consensus is minimum and equal to zero.

The value of $\Sigma$ (maximum standard deviation) may be calculated in two different ways depending on whether one considers a distribution having the same number of persons and the same mean value or a distribution independent from the observed mean.

In the first case:

The number of persons is designated by N, the number of items by N1 and the number of compartments of the cloth by the number N2. If, in addition, the notes or marks of the compartments where each person has placed the same item are termed X1, X2... XN, the observed mean is:

$$M = \frac{X1 + X2 + \ldots + KN}{N}$$

The sum of the marks for the considered item is:

$$S = M \times N = X1 + X2 + \ldots + XN$$

There is constructed an extreme distribution Y1,Y2...YN, of N values such that:

$$Y1 + Y2 + \ldots YN = S$$

For this purpose, the value 1 is first of all given to all the Ys. There then remain S-N points to be distributed. The maximum of possible cases is then completed at N2. When this has been done, the possible remainder is added to one of the values Y which remained at value 1. The maximum sigma is calculated which is the standard deviation of this distribution Y1, Y2... YN.

Example: there are observed for three persons and a given item the following compartments: 40, 60 and 80. This gives the sum S of 180. There are first of all placed the following values (in the example N2 is equal to 100):

|  | Y1 | Y2 | Y3 | sum | remainder |
|---|---|---|---|---|---|
|  | 1 | 1 | 1 | 3 | 180 − 3 = 177 |
| complement to 100: | 100 | 1 | 1 | 102 | 78 |
| allotment of remainder: | 100 | 79 | 1 | 180 | 0 |

The distribution 100, 79, 1 gives the maximum "large sigma" standard deviation.

In the second case, the "large sigma" is calculated independently of the sum and therefore of the observed mean:

It can easily be shown that if the observed mean is not taken into account, the "worst" of the distribution which may occur on the cloth consists in the following:

the first person places the card of item 1 on the first compartment;

the second person places it on the last compartment;

the third person places it on the first compartment, etc...

all the cards being distributed on the two end compartments.

In this case, the distribution of the Y will be written: 1, N2, 1, N2, 1, etc... The case of the largest possible dispersion is equivalent to an even number of notes or marks, and in particular to the distribution 1, N2. The mean is then:

$$M = (1 + N2)/2$$

The corresponding standard deviation is calculated:

| value | deviation | square of the deviation |
|---|---|---|
| 1 | $(1 - N2)/2$ | $[(1 - N2)/2]^2$ |
| N2 | $(N2 - 1)/2$ | $[(1 - N2)/2]^2$ | which gives a standard deviation of $(N2-1)/2$. In the case of an example with N2:100, this deviation has the value 99/2, namely 49.5.

The calculation of the consensus indicator is preferably carried out by a computer in which are inserted the gathered items of information and which has a program adapted to this calculation and to other conventional statistic calculations which will not be described here.

This original notion of consensus is very interesting since it permits in particular regrouping a posteriori in sub-targets the persons who gave the same values, for example to within more or less 10%, to the same proposition; it also permits observing the systematically discriminating propositions within the same sample or the same target.

The notion of consensus permits bringing out the "invariables" in a plurality of populations. Within the most important factors for each of the populations, which are generally different, it is extremely useful, in particular for effecting market researches, to be in a position to indicate that which remains stable when passing from one population or target to another.

Figure 2:
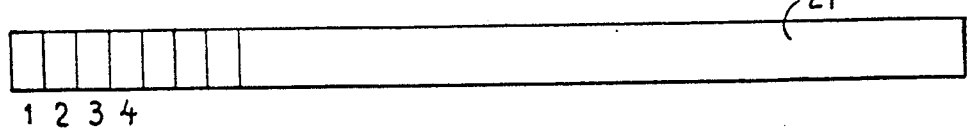
FIGS. 2 and 3 show two variants relating to the arrangement of the compartments on the support.
Figure 3:
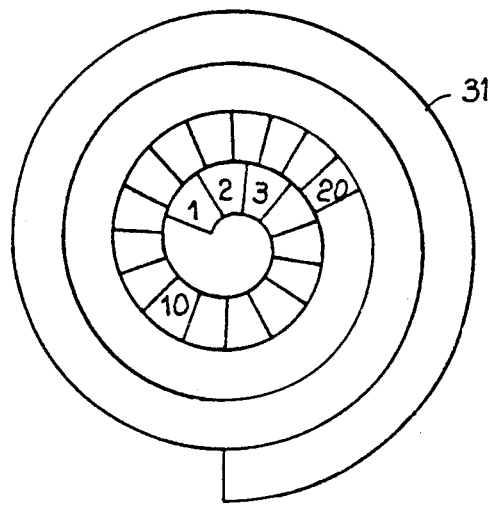

In order to illustrate that the invention is not limited to the embodiment shown in FIG. 1, a different arrangement of the compartments on a "cloth" is shown in FIGS. 2 and 3. In the case of FIG. 2, these compartments are disposed in accordance with a single row 21 so that the cards may be classified in a linear manner;

In the embodiment shown in FIG. 2, the manner of classifying is also linear but the line 31 along which the compartments are arranged has a spiral shape.

It must be understood that these various arrangements are given merely by way of examples, and in no way limit the scope of the invention defined in the claims.

Also note as further advantages of the method and device according to the invention the effectiveness of the method for gathering or collecting information permits operating with smaller samples than in conventional methods, these smaller samples being nonetheless completely representative.

Furthermore, and as already mentioned, the values or the data gathered are much closer to a real situation and are therefore much more coherent.

The method and the device according to the invention are applicable in many fields among which may be mentioned: market research, management and direction of firms, recruiting, testing methods, etc...

What is claimed is:

1. A method for gathering and classifying items of information from persons representing a sample of a population, said method comprising:

establishing a list of propositions;

placing each proposition on a distinct card;

supplying to each of the persons of the sample a group of cards each bearing one of the propositions on which these persons must give an opinion;

providing a support having a plurality of compartments at respectively different locations arranged in a grid comprising rows and columns, the number of compartments being greater than the number of cards, each of said rows having the same number of columns;

assigning a different value to each of the respective compartments such that said values increase along a direction of each of said rows and along a direction of each of said columns;

placing all of the corresponding cards in various compartments of the support in accordance with selections made by each of the persons in the sample, whereby some of the compartments will contain at least one card and some of the compartments will remain empty such that each card containing its proposition can be placed at only one of said compartments; and assigning to each proposition a "mark" or a "coefficient" in accordance with the corresponding card's location on the support.

2. A method of according to claim 1, further comprising: assigning to each of the questions or propositions, submitted to the persons constituting the sample, a coefficient determined from the location of the compartment containing the corresponding card; effecting a classification of all of the questions or propositions for each of the persons of the sample; determining for each question or proposition or for a group of questions or propositions the real dispersion ($\sigma$) of the classifications effected by all of the persons constituting the sample; determining the maximum theoretical dispersion ($\Sigma$) for a sample of the same size; and calculating the value of a magnitude (C) by means of the formula:

$$c = K\left(1 - \frac{\sigma}{\Sigma}\right),$$

in which K is a coefficient preferably equal to 100.

3. A method according to claim 2, comprising determining the maximum theoretical dispersion (maximum standard deviation) for a distribution having the same number of persons and the same mean as the observed distribution.

4. A method according to claim 2, comprising determining the maximum theoretical dispersion (maximum standard deviation) for a distribution having the same number of persons but independently of the observed mean.

* * * * *